(12) United States Patent
Birch et al.

(10) Patent No.: US 12,109,863 B2
(45) Date of Patent: Oct. 8, 2024

(54) ACTIVE SUSPENSION SYSTEM

(71) Applicant: JAGUAR LAND ROVER LIMITED, Coventry (GB)

(72) Inventors: Luke Birch, Mickleton (GB); Dennis Lausecker, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 18/017,451

(22) PCT Filed: Jul. 21, 2021

(86) PCT No.: PCT/EP2021/070456
§ 371 (c)(1),
(2) Date: Jan. 23, 2023

(87) PCT Pub. No.: WO2022/018172
PCT Pub. Date: Jan. 27, 2022

(65) Prior Publication Data
US 2023/0278387 A1    Sep. 7, 2023

(30) Foreign Application Priority Data

Jul. 21, 2020 (GB) .................................... 2011272

(51) Int. Cl.
*B60G 17/08* (2006.01)
*B60G 17/015* (2006.01)
(Continued)

(52) U.S. Cl.
CPC ......... *B60G 17/08* (2013.01); *B60G 17/0152* (2013.01); *B60G 17/016* (2013.01);
(Continued)

(58) Field of Classification Search
CPC ............ B60G 21/073; B60G 2202/413; B60G 2202/416; B60G 17/08; B60G 2204/62; B60G 2600/182; B60G 17/0152
(Continued)

(56) References Cited

U.S. PATENT DOCUMENTS 5,601,307 A * 2/1997 Heyring ................. B60G 21/06
   701/37
5,682,980 A * 11/1997 Reybrouck ............ B60G 17/04
   280/124.16
(Continued)

FOREIGN PATENT DOCUMENTS

CN  101765727 A   6/2010
GB     521741 A   5/1940
(Continued)

OTHER PUBLICATIONS

International Search Report and Written Opinion for Application No. PCT/EP2021/070456, dated Nov. 24, 2021, 10 pages.
(Continued)

*Primary Examiner* — Amy R Weisberg
*Assistant Examiner* — Caitlin Anne Miller
(74) *Attorney, Agent, or Firm* — Reising Ethington P.C.

(57) ABSTRACT

Aspects of the present invention relate to an actuator system for a vehicle suspension system comprising:
a first actuator comprising a piston, a first upper fluidic chamber and a second lower fluidic chamber, the first and second fluidic chambers separated by the piston;
a second actuator comprising a piston, a first upper fluidic chamber and a second lower fluidic chamber, the first and second fluidic chambers separated by the piston;
a first hydraulic gallery fluidly connecting the first upper fluidic chamber of the first actuator and one of the first and second fluidic chambers of the second actuator;
(Continued)

a second hydraulic gallery fluidly connecting the second lower fluidic chamber of the first actuator and the other of the first and second fluidic chambers of the second actuator; and at least one pump configured to pump fluid between the first and second hydraulic galleries.

11 Claims, 9 Drawing Sheets

(51) Int. Cl.
*B60G 17/016* (2006.01)
*B60G 21/073* (2006.01)

(52) U.S. Cl.
CPC ........ *B60G 21/073* (2013.01); *B60G 2202/24* (2013.01); *B60G 2202/413* (2013.01); *B60G 2202/416* (2013.01); *B60G 2204/62* (2013.01); *B60G 2206/41* (2013.01); *B60G 2500/104* (2013.01); *B60G 2600/182* (2013.01); *B60G 2800/012* (2013.01); *B60G 2800/014* (2013.01); *B60G 2800/016* (2013.01); *B60G 2800/162* (2013.01); *B60G 2800/9122* (2013.01); *B60G 2800/9123* (2013.01); *B60G 2800/916* (2013.01)

(58) Field of Classification Search
USPC ....................................................... 280/5.507
See application file for complete search history.

(56) References Cited

U.S. PATENT DOCUMENTS

| | | | | |
|---|---|---|---|---|
| 5,915,701 A * | 6/1999 | Heyring | ................. | B60G 21/06 280/6.154 |
| 6,761,371 B1 * | 7/2004 | Heyring | ................. | B60G 21/06 280/124.159 |
| 7,311,314 B2 * | 12/2007 | Kasamatsu | .......... | B60G 21/106 280/124.16 |
| 7,959,164 B2 * | 6/2011 | Keane | ................ | B60G 21/0555 280/5.509 |
| 8,465,025 B2 * | 6/2013 | Venton-Walters | ......................... | B60G 17/0525 280/124.16 |
| 11,529,836 B1 * | 12/2022 | Schubart | ................ | B60G 13/08 |
| 2001/0006285 A1 | 7/2001 | Franzini | | |
| 2005/0225048 A1 | 10/2005 | Kasamatsu | | |
| 2006/0192361 A1 | 8/2006 | Anderson et al. | | |
| 2008/0088107 A1 | 4/2008 | Bitter | | |
| 2012/0049470 A1 | 3/2012 | Rositch | | |
| 2014/0265168 A1 * | 9/2014 | Giovanardi | ........... | F16K 11/065 280/5.5 |
| 2020/0139779 A1 * | 5/2020 | Goto | ..................... | B60G 17/08 |
| 2023/0294476 A1 * | 9/2023 | Birch | ................... | B60G 21/073 280/5.515 |

FOREIGN PATENT DOCUMENTS

| | | |
|---|---|---|
| GB | 1387970 A | 3/1975 |
| JP | H01293214 A | 11/1989 |
| JP | 200887590 A | 4/2008 |
| WO | 2004076211 A1 | 9/2004 |

OTHER PUBLICATIONS

Combined Search and Examination Report for Application No. GB1908415.1, dated Dec. 3, 2019, 6 pages.

Combined Search and Examination Report for Application No. GB2011272.8, dated Dec. 17, 2020, 6 pages.

English summary of Japanese Office Action corresponding to application 2023-504462, dated Jan. 30, 2024, 3 pages.

European Office Action corresponding to application 21 748 825.3, dated Jun. 28, 2024, 7 pages.

Japanese Office Action corresponding to application 2023-504462, dated Jul. 30, 2024, 7 pages.

* cited by examiner

US 12,109,863 B2

ACTIVE SUSPENSION SYSTEM

TECHNICAL FIELD

The present disclosure relates to an active suspension system. Particularly, but not exclusively, it relates to an active suspension system in a passenger vehicle.

BACKGROUND

The wheels, or other ground-engaging structures such as tracks, of a vehicle with suspension, are able to move relative to the body of the vehicle. The body of such a vehicle has various degrees of freedom of movement. The significant degrees of freedom are "heave", or movement in a vertical direction, pitch and roll. For example, the body of a vehicle with suspension will experience roll movement when, for example, turning.

Active suspension systems are known that can be controlled to counter or prevent roll in a vehicle body. However, certain active systems can be complex and expensive to implement.

Packaging systems, such as suspension systems, in a vehicle can be difficult in view of physical and technical restrictions for doing so.

SUMMARY OF THE INVENTION

It is an aim of the present invention to address one or more of the disadvantages associated with the prior art.

Aspects and embodiments of the invention provide an actuator system, a vehicle, a method and computer software as claimed in the appended claims.

According to an aspect of the present invention, there is provided an actuator system for a vehicle suspension system comprising: a first actuator comprising a piston, a first upper fluidic chamber and a second lower fluidic chamber, the first and second fluidic chambers separated by the piston; a second actuator comprising a piston, a first upper fluidic chamber and a second lower fluidic chamber, the first and second fluidic chambers separated by the piston; a first hydraulic gallery fluidly connecting the first upper fluidic chamber of the first actuator and one of the first and the second fluidic chambers of the second actuator; a second hydraulic gallery fluidly connecting the second lower fluidic chamber of the first actuator and the other of the first and second fluidic chambers of the second actuator; and at least one pump configured to pump fluid between the first and second hydraulic galleries. An advantage is that the system can provide movement control for a vehicle in an efficient manner, for example without requiring fully active suspension at each wheel. Such movement control may include, by way of example, roll control, pitch control, heave control and/or a combination of roll, pitch and/or heave control.

The system may comprise a single, bidirectional pump configured to pump fluid between the first and second hydraulic galleries.

The first actuator may be coupled to a first wheel and the second actuator may be coupled to a second wheel, wherein the first and second wheels share a common axle.

In some embodiments, the first hydraulic gallery fluidly connects the first upper fluidic chamber of the first actuator and the second lower fluidic chamber of the second actuator, and the second hydraulic gallery fluidly connects the second lower fluidic chamber of the first actuator and the first upper fluidic chamber of the second actuator.

The actuator system may comprise: a cross over connection, the cross over connection fluidly connecting the first fluidic chamber of the first actuator and the second fluidic chamber of the second actuator; and fluidly connecting the second fluidic chamber of the first actuator and the first fluidic chamber of the second actuator.

The cross over connection may be comprised in a valve block of the actuator system.

In some embodiments, the first hydraulic gallery fluidly connects the first upper fluidic chamber of the first actuator and the first upper fluidic chamber of the second actuator, and the second hydraulic gallery fluidly connects the second lower fluidic chamber of the first actuator and the second lower fluidic chamber of the second actuator.

The actuator system may comprise a through connection, the through connection fluidly connecting the first fluidic chamber of the first actuator and the first fluidic chamber of the second actuator; and fluidly connecting the second fluidic chamber of the first actuator and the second fluidic chamber of the second actuator.

The through connection may be comprised in a valve block of the actuator system.

The actuator system may comprise at least one controller configured to control the at least one pump to pump fluid between the first and second hydraulic galleries.

According to another aspect of the present invention, there is provided a vehicle comprising at least one actuator system according to any preceding paragraph and/or as described herein.

The vehicle may comprise a first actuator system associated with a first axle of the vehicle and a second, separate actuator system associated with a second, different axle of the vehicle.

The vehicle may be an autonomous vehicle.

In some examples, the vehicle is a shared mobility vehicle.

According to another aspect of the present invention, there is provided a method of operating the actuator system, the method comprising: determining a target pressure for at least one of the first and second chambers of the first and/or second actuators; controlling the at least one pump to generate the determined target pressure or pressures.

Controlling the at least one pump may comprise controlling the at least one pump to pump fluid from the first hydraulic gallery to the second hydraulic gallery.

Controlling the at least one pump may comprise controlling the at least one pump to pump fluid from the second hydraulic gallery to the first hydraulic gallery.

According to another aspect of the present invention, there is provided computer software that, when executed, is arranged to perform the method.

According to another aspect of the present invention, there is provided a non-transitory computer readable medium comprising computer readable instructions that, when executed by a processor, cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
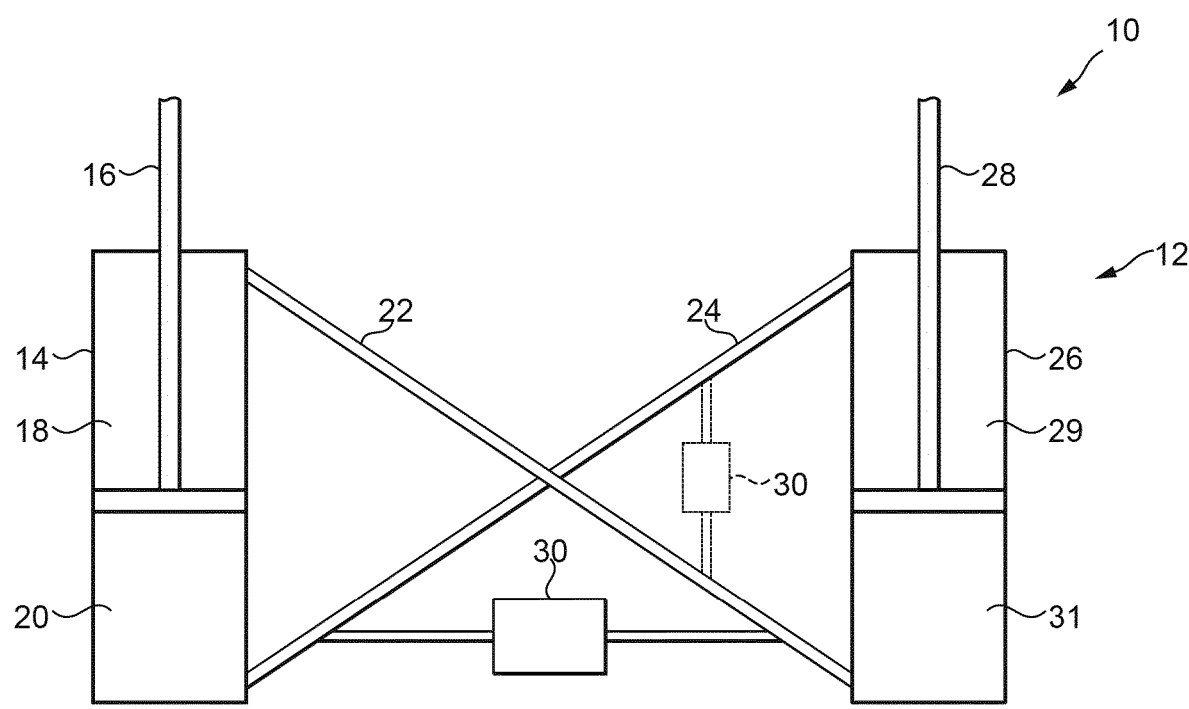
FIG. 1 illustrates an example of an actuator system for a vehicle suspension system.

FIG. 1 illustrates an example of an actuator system 10. In the illustrated example the actuator system 10 is an actuator system 10 for a suspension system 12.

With reference to FIG. 1, the actuator system 10 comprises a first actuator 14 comprising a piston 16, a first upper fluidic chamber 18 and a second lower fluidic chamber 20, the first and second fluidic chambers 18, 20 separated by the piston 16.

The actuator system 10 also comprises a second actuator 26 comprising a piston 28, a first upper fluidic chamber 29 and a second lower fluidic chamber 31, the first and second fluidic chambers 29, 31 separated by the piston 28.

The actuator system 10 of FIG. 1 also comprises a first hydraulic gallery 22 fluidly connecting the first upper fluidic chamber 18 of the first actuator 14 and a second lower fluidic chamber 31 of the second actuator 26 and a second hydraulic gallery 24 fluidly connecting the second lower fluidic chamber 20 of the first actuator 14 and a first upper fluidic chamber 29 of the second actuator 26.

The actuator system 10 of FIG. 1 also comprises at least one pump 30 configured to pump fluid between the first and second hydraulic galleries 22, 24.

In examples, the actuator system 10 of FIG. 1 can comprise one or more additional components not illustrated in FIG. 1.

For example, the actuator system 10 can comprise one or more valves V, such as one or more pressure control valves V1, one or more damper valves V2, one or more check valves V3 and so on.

Additionally, or alternatively, the actuator system 10 can, in examples, comprise one or more accumulators A. See, for example, FIGS. 2 and 3.

The one or more valves and/or one or more accumulators A can be configured to control flow of fluid around the actuator system 10.

One or more features referred to in relation to FIG. 1 may be found in the other figures.

The suspension system 12 comprises other elements or components, such as one or more springs and/or air springs. See, for example, FIG. 3.

In use, the first and second actuators 14, 26 are used to improve the ride of the vehicle 46 by extending or contracting in response to forces imparted upon the actuator system 10.

For example, in use the first actuator 14 and/or the second actuator 26 can contract or extend by movement of the piston 16, 28.

In examples, the actuators 14, 26 couple the body 17 of a vehicle 46 to the associated wheel 32, 34. In some embodiments, the wheels 32, 34 can be associated with a common axle 36. Alternatively, the wheels may be associated with different axles 36.

Accordingly, in use, the body 17 can move relative to the wheels 32, 34 through extension and/or contraction of the actuators 14, 26.

In the example of FIG. 1 the first hydraulic gallery 22 fluidly connects the first upper fluidic chamber 18 of the first actuator 14 and the second lower fluidic chamber 31 of the second actuator 26.

The first hydraulic gallery 22 can be considered to allow fluid to move or flow between the first upper fluidic chamber 18 of the first actuator 14 and the second lower fluidic chamber 31 of the second actuator 26.

In examples, any suitable means for providing fluidic connection between the first upper fluidic chamber 18 of the first actuator 14 and the second lower fluidic chamber 31 of the second actuator 26 can be used. For example, any suitable hose, tube and/or pipe and so on can be used.

Additionally or alternatively the first hydraulic gallery 22 can directly or indirectly connect the first upper and second lower chambers 18, 31 and/or can include any number of intervening elements, including no intervening elements.

In examples, any suitable number of connections between the upper fluidic chamber 18 of the first actuator 14 and the second lower fluidic chamber 31 of the second actuator 26 can be used.

In FIG. 1, the second hydraulic gallery 24 fluidly connects the second lower fluidic chamber 20 of the first actuator 14 and the first upper fluidic chamber 29 of the second actuator 26.

The second hydraulic gallery 24 can be considered to allow fluid to move or flow between the second lower fluidic chamber 20 of the first actuator 14 and the first upper fluidic chamber 29 of the second actuator 26.

In examples, any suitable means for providing fluidic connection between the second lower fluidic chamber 20 of the first actuator 14 and the first upper fluidic chamber 29 of the second actuator 26 can be used. For example, any suitable hose, tube and/or pipe and so on can be used.

Additionally or alternatively the second hydraulic gallery 22 can directly or indirectly connect the second lower and first upper chambers 20, 29 and/or can include any number of intervening elements, including no intervening elements.

In examples, any suitable number of connections between the second lower fluidic chamber 20 of the first actuator 14 and the first upper fluidic chamber 29 of the second actuator 26 can be used.

In examples, the first and second hydraulic galleries can be considered first and second hydraulic connections, links, attachments, networks, couplings, joinings and so on.

In examples the first and second hydraulic galleries 22, 24 can be considered to include the fluidic chambers 18, 31, 20, 29 to which they are connected.

In the example of FIG. 1, the at least one pump 30 is configured to pump fluid, such as hydraulic fluid, between the first and second hydraulic galleries 22, 24. Any suitable hydraulic fluid can be used.

In examples, any suitable pump or pumps can be used.

The actuator system 10 can comprise any suitable number of pumps 30 at any suitable location(s) to pump fluid between the first and second hydraulic galleries 22, 24.

This is illustrated in the example of FIG. 1 by the dashed pump 30.

For example, in examples the system 10 comprises a single bidirectional pump 30 configured to pump fluid between the first and second hydraulic galleries 22, 24. See, for example, FIGS. 2 and 3.

Accordingly, in examples the actuator system 10 can comprise a single pump 30 per set of associated wheels 32, 34 or per axle 36.

In examples the pump or pumps 30 can be connected between the first and second hydraulic galleries 22, 24 in any suitable way to allow fluid to be pumped between the two hydraulic galleries 22, 24.

The pumping of fluid between the first and second hydraulic galleries 22, 24 allows for active movement control of a vehicle 46. In embodiments in which the actuators 14, 26 couple the body 17 of a vehicle 46 to wheels 32, 34 on either side of the vehicle 46, for example associated with a common axle, the pumping of fluid between the first and second hydraulic galleries 22, 24 allows for active roll control of the vehicle 46.

For example, when the pump(s) 30 is controlled to pump fluid from the first hydraulic gallery 22 to the second hydraulic gallery 24 fluid will be moved from the first upper fluidic chamber 18 of the first actuator 14 and the second lower fluidic chamber 31 of the second actuator 26 to the second hydraulic gallery 24, the second lower fluidic chamber 20 of the first actuator 14 and the first upper fluidic chamber 29 of the second actuator 26.

In examples, when the pump(s) 30 is controlled to pump fluid from the first hydraulic gallery 22 to the second hydraulic gallery 24 the pressure in the first hydraulic gallery, including the first upper fluidic chamber 18 of the first actuator 14 and the second lower fluidic chamber 31 of the second actuator 26, decreases and the pressure in the second hydraulic gallery 24, including the second lower fluidic chamber 20 of the first actuator 14 and the first upper fluidic chamber 29 of the second actuator 26 is increased.

Accordingly, when fluid is pumped from the first hydraulic gallery 22 to the second hydraulic gallery 24 the first actuator 14 will tend to extend and the second actuator 26 will tend to contract. This will cause the body 17 of the vehicle 46 to roll to the right as viewed in FIG. 1.

When the pump(s) 30 is controlled to pump fluid from the second hydraulic gallery 24 to the first hydraulic gallery 22 fluid will be moved from the second lower chamber 20 of the first actuator 14 and the first upper fluidic chamber 29 of the second actuator 26 to the first hydraulic gallery 22, the first upper fluidic chamber 18 of the first actuator 14 and the second lower fluidic chamber 31 of the second actuator 26.

In examples, when the pump(s) 30 is controlled to pump fluid from the second hydraulic gallery 24 to the first hydraulic gallery 22 the pressure of the second hydraulic gallery 24, including the first upper fluidic chamber 29 of the second actuator 26 and the second lower chamber 20 of the first actuator 14 will decrease and the pressure of the first hydraulic gallery 22, including the second lower fluidic chamber 31 of the second actuator 26 and the first upper fluidic chamber 18 of the first actuator 14 will increase.

In such examples, the second actuator 26 will tend to extend and the first actuator 14 will tend to contract. Accordingly, in such examples the body 17 of the vehicle 46 will roll to the left as viewed in FIG. 1.

In embodiments in which the actuators 14, 26 couple the body 17 of a vehicle 46 to wheels 32, 34 associated with different front and rear axles 36, the pumping of fluid between the first and second hydraulic galleries 22, 24 allows for active pitch control of the vehicle 46, whereby pumping of the fluid from one hydraulic gallery to another will tend to cause the body 17 of the vehicle 46 to pitch forwards or backwards.

In this way, roll and/or pitch of the body 17 of the vehicle 46 can be actively controlled by use of the actuator system 10.

In particular, roll and/or pitch of the body 17 of the vehicle 46 can be controlled by controlling the one or more pumps 30.

In examples, this is achieved by using a simple hydraulic network compared to, for example, fully active suspension at each wheel of a vehicle.

Furthermore, the actuator system 10 of FIG. 1 provides for active, controllable roll and/or pitch control, not merely passive control which is also advantageous compared to, for example, passive suspension systems.

The actuator system 10 can be used to compensate and/or correct for body roll and/or pitch caused by movement of a vehicle 46.

In examples in which the actuators 14, 26 couple the body 17 of a vehicle 46 to wheels 32, 34 on either side of the vehicle 46, if a vehicle 46 is turning left this will cause the body 17 of the vehicle 46 to roll to the right, tending to compress the second actuator 26 and extend the first actuator 14 in FIG. 1.

In examples, the pump(s) 30 can be controlled in such circumstances to pump fluid from the second hydraulic gallery 24 to the first hydraulic gallery 22 to counteract the roll of the body 17 of the vehicle 46 by increasing the pressure in the first upper fluidic chamber 18 of the first actuator 14 and second lower fluidic chamber 31 of the second actuator 26.

In this way roll of the body 17 of the vehicle 46 can be actively controlled.

In examples in which the actuators 14, 26 couple the body 17 of a vehicle 46 to wheels 32, 34 on either side of the vehicle 46, if a vehicle 46 is turning right this will cause the body 17 of the vehicle 46 to roll to the left, tending to compress the first actuator 14 and extend the second actuator 26 in FIG. 1.

In examples, the pump(s) 30 can be controlled in such circumstances to pump fluid from the first hydraulic gallery 22 to the second hydraulic gallery 24 to counteract the roll of the body 17 of the vehicle 46 by increasing the pressure in the second lower fluidic chamber 20 of the first actuator 14 and first upper fluidic chamber 29 of the second actuator 26.

In this way roll of the vehicle 46 can be actively controlled.

However, the actuator system 10 is configured to provide active roll and/or pitch control of the vehicle 46 as desired. For example, in certain circumstances it may be desired to roll the body 17 of the vehicle 46 to the left or right and in such circumstances the at least one pump 30 can be controlled to pump fluid in the actuator system 10 to roll the vehicle body 17 to the left or right.

Figure 2:
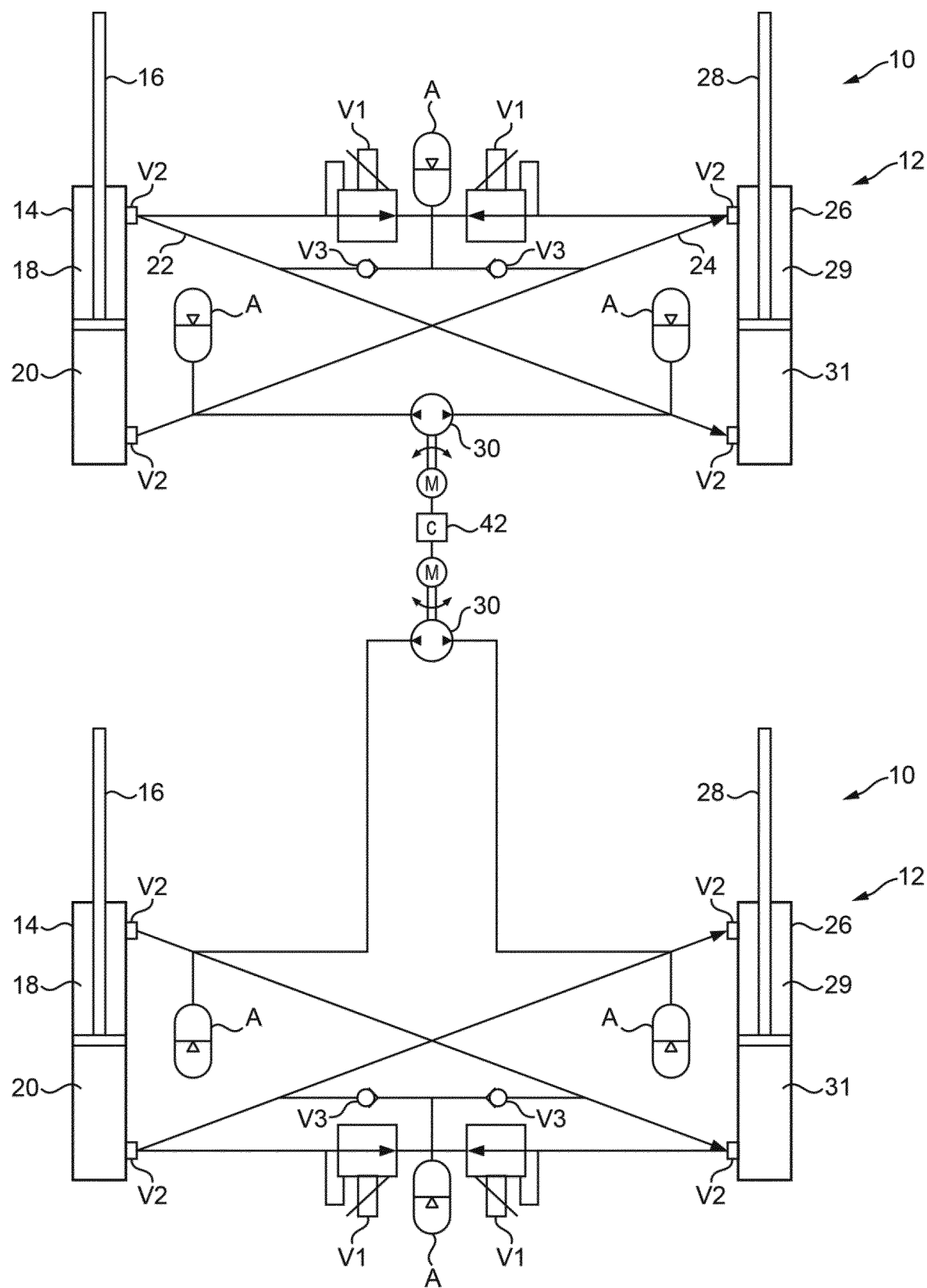
FIG. 2 illustrates an example of plurality of actuator systems for a vehicle suspension system.

FIG. 2 illustrates an example of a plurality of actuator systems 10 for a vehicle suspension system 12.

One or more elements in the example of FIG. 2 can be as described in relation to FIG. 1.

The example of FIG. 2 is similar to the example illustrated in FIG. 1. However, in the example of FIG. 2 there is a first actuator system 10 associated with a front axle and front wheels of a vehicle 46. This is the upper actuator system 10 illustrated in FIG. 2.

In addition, in the example of FIG. 2, a second actuator system 10, associated with a rear axle of a vehicle 46 is present. This is illustrated as the lower actuator system 10 in the example of FIG. 2.

However, in examples, any suitable number of actuator systems 10 on any suitable number of axles of a vehicle can be provided.

Accordingly, FIG. 2 illustrates a first actuator system 10 associated with a first axle of a vehicle 46 and a second, separate actuator system 10 associated with a second, different axle of a vehicle 46.

The actuator systems 10 in FIG. 2 comprise first and second actuators 14, 26 and first and second hydraulic galleries 22, 24 similarly to or the same as FIG. 1.

In the example of FIG. 2 the actuator systems 10 comprise a single bidirectional pump 30 configured to pump fluid between the first and second hydraulic galleries 22, 24 of the actuator systems 10.

The actuator systems 10 in FIG. 2 also comprise a number of pressure control valves V1, damper valves V2, check valves V3 and accumulators A to control movement of fluid around the actuator systems 10. The use of the valves and accumulators will not be described in detail herein.

Also illustrated in the example of FIG. 2 the actuator systems 10 comprises at least one controller 42 configured to control the at least one pump 30 to pump fluid between the first and second hydraulic galleries 22, 24 of the respective actuator systems 10.

In the example of FIG. 2 a single controller 42 is shown. However, in examples, any suitable number of controllers 42 can be used.

Figure 6:
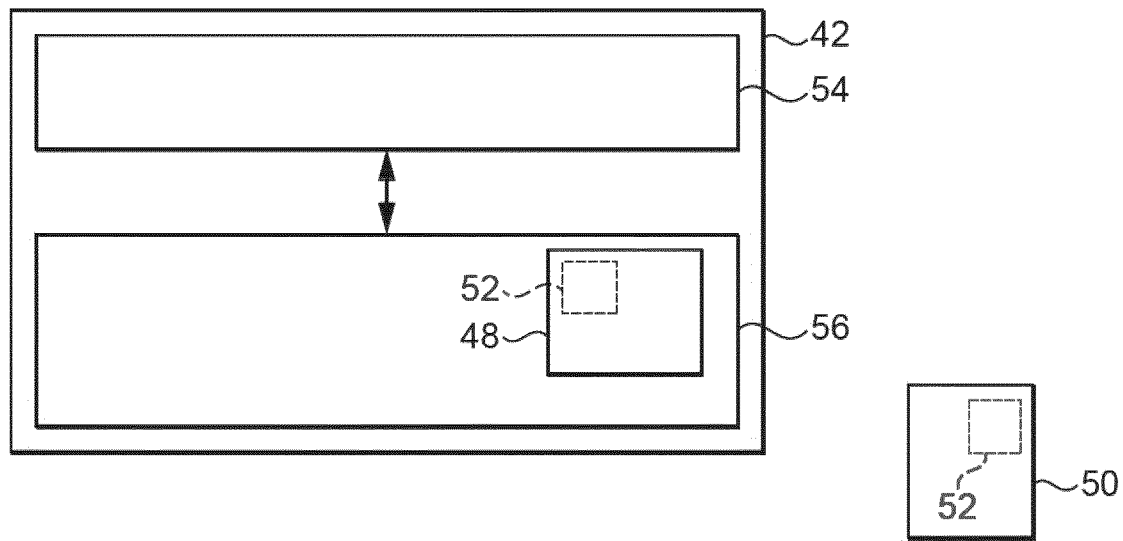
FIG. 6 illustrates an example of a controller

In addition, any suitable controller 42 or controllers 42 can be used, see, for example, FIG. 6.

In the example of FIG. 2 the controller 42 is configured to control the single, bidirectional pump 30 of the actuator systems 10 to control the roll of the body 17 of a vehicle 46 as described in relation to FIG. 1.

In the example of FIG. 2 the controller 42 is configured to control the extension or contraction of the first and second actuators 14, 26 of the actuator systems 10 in coordination or separately.

For example, the controller 42 is, in examples, configured to control the actuator systems 10 in a coordinated or independent fashion based on the requirements and/or environment and/or context of the vehicle 46.

Figure 3:
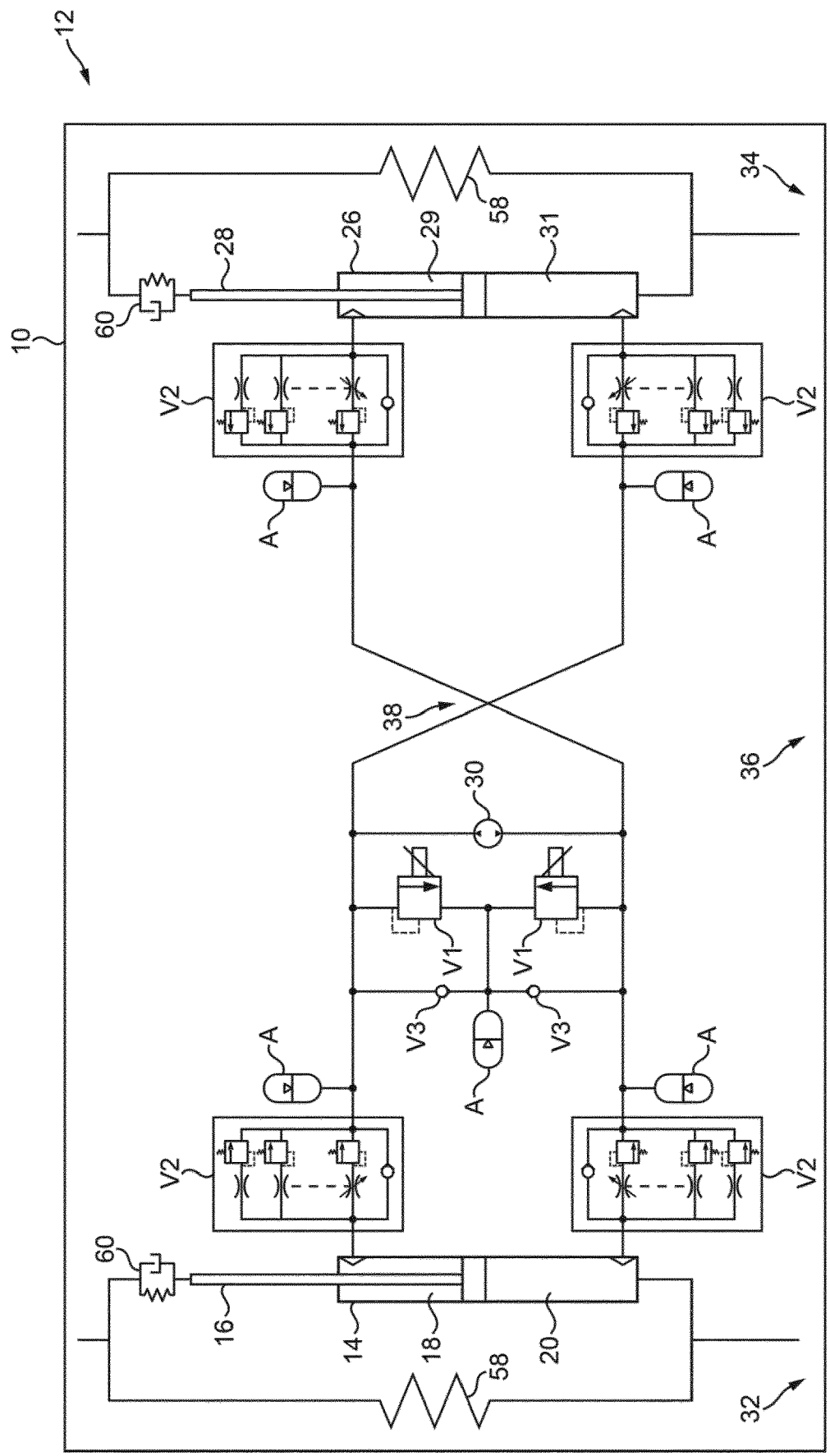
FIG. 3 illustrates an example of an actuator system for a vehicle suspension system.

FIG. 3 illustrates an example of an actuator system 10 for a vehicle suspension system 12.

One or more elements in FIG. 3 may be as described in relation to FIG. 1 and/or FIG. 2.

The actuator system 10 illustrated in FIG. 3 comprises first and second actuators 14, 26 and first and second hydraulic galleries 22, 24.

The actuator system 10 of FIG. 3 also comprises various valves V1, V2, V3 and accumulators A.

In addition, in the example of FIG. 3 the vehicle suspension system 12 comprises springs or air springs 58 which couple the body 17 of the vehicle 46 to the associated wheels 32, 34.

The suspension system 12 also comprises top mount 60.

In one embodiment of the example of FIG. 3, the first actuator 14 is coupled to a first wheel 32 and the second actuator 26 is coupled to a second wheel 34, wherein the first and second wheels 32, 34 share a common axle 36. In such an embodiment the actuator system 10 is able to control roll of the body 17 of the vehicle 46 as described in relation to FIG. 1 and/or FIG. 2.

In an alternative embodiment of the example of FIG. 3, the first actuator 14 is coupled to a first wheel 32 and the second actuator 26 is coupled to a second wheel 34, wherein the first and second wheels 32, 34 are associated with different front and rear axles 36. In such an embodiment the actuator system 10 is able to control pitch of the body 17 of the vehicle 46 as described in relation to FIG. 1 and/or FIG. 2.

In the example of FIG. 3 the actuator system 10 comprises a crossover connection 38, the crossover connection 38 fluidly connecting the first fluidic chamber 18 of the first actuator 14 and the second fluidic chamber 31 of the second actuator 26 and fluidly connecting the second fluidic chamber 20 of the first actuator 14 and the first fluidic chamber 29 of the second actuator 26.

In examples, any suitable crossover connection can be used. For example, in examples, the crossover connection 38 is comprised in a valve block of the actuator system 10.

In some examples the crossover connection is internal to the valve block and comprises double outputs for each hydraulic gallery.

In some examples the crossover connection is a separate manifold block connected to the pump 30 by any suitable hydraulic connections such as pipes, hoses and so on.

As a system there may be a combined use of ports on the valve block, for example on a front axle, and a separate manifold, for example on the rear axle.

In the example of FIG. 3 the actuator system 10 comprises a single bidirectional pump 30 configured to pump fluid between the first and second hydraulic galleries 22, 24 to control roll and/or pitch of the body 17 of the vehicle 46 as described in relation to FIG. 1 and/or FIG. 2.

Figure 10:
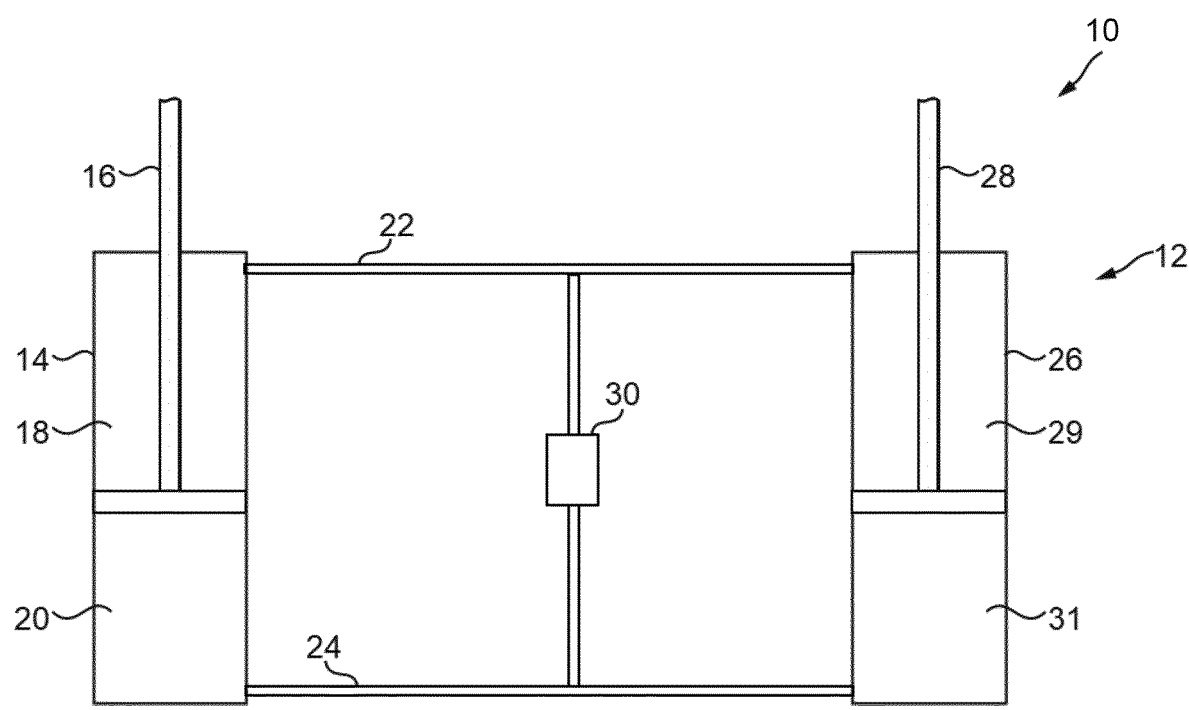
FIG. 10 illustrates an alternative example of an actuator system for a vehicle suspension system.

FIG. 10 illustrates an alternative example of an actuator system 10. In the illustrated example of FIG. 10 the actuator system 10 is an actuator system 10 for a suspension system 12.

With reference to FIG. 10, the actuator system 10 comprises a first actuator 14 comprising a piston 16, a first upper fluidic chamber 18 and a second lower fluidic chamber 20, the first and second fluidic chambers 18, 20 separated by the piston 16. The actuator system 10 also comprises a second actuator 26 comprising a piston 28, a first upper fluidic chamber 29 and a second lower fluidic chamber 31, the first and second fluidic chambers 29, 31 separated by the piston 28. The actuator system 10 of FIG. 1 also comprises a first hydraulic gallery 22 fluidly connecting the first upper fluidic chamber 18 of the first actuator 14 and a first upper fluidic chamber 29 of the second actuator 26 and a second hydraulic gallery 24 fluidly connecting the second lower fluidic chamber 20 of the first actuator 14 and a second lower fluidic chamber 31 of the second actuator 26. The actuator system 10 of FIG. 1 also comprises at least one pump 30 configured to pump fluid between the first and second hydraulic galleries 22, 24.

In examples, the actuator system 10 of FIG. 10 can comprise one or more additional components not illustrated in FIG. 10. For example, the actuator system 10 can comprise one or more valves V, such as one or more pressure control valves V1, one or more damper valves V2, one or more check valves V3 and so on. Additionally, or alternatively, the actuator system 10 can, in examples, comprise one or more accumulators A. See, for example, FIGS. 11 and 12. The one or more valves and/or one or more accumulators A can be configured to control flow of fluid around the actuator system 10.

One or more features referred to in relation to FIG. 10 may be found in the other figures.

The suspension system 12 comprises other elements or components, such as one or more springs and/or air springs. See, for example, FIG. 12.

In examples, the actuators 14, 26 couple the body 17 of a vehicle 46 to the associated wheel 32, 34. In some embodiments, the wheels 32, 34 can be associated with a common axle 36. Alternatively, the wheels may be associated with different axles 36. Accordingly, in use, the body 17 can move relative to the wheels 32, 34 through extension and/or contraction of the actuators 14, 26.

In the example of FIG. 10 the first hydraulic gallery 22 fluidly connects the first upper fluidic chamber 18 of the first actuator 14 and the first upper fluidic chamber 29 of the second actuator 26. The first hydraulic gallery 22 can be considered to allow fluid to move or flow between the first upper fluidic chamber 18 of the first actuator 14 and the first upper fluidic chamber 29 of the second actuator 26.

In examples, any suitable means for providing fluidic connection between the first upper fluidic chamber 18 of the first actuator 14 and the first upper fluidic chamber 29 of the second actuator 26 can be used. For example, any suitable hose, tube and/or pipe and so on can be used.

Additionally or alternatively the first hydraulic gallery 22 can directly or indirectly connect the first upper chambers 18, 29 and/or can include any number of intervening elements, including no intervening elements. In examples, any suitable number of connections between the upper fluidic chamber 18 of the first actuator 14 and the first upper fluidic chamber 29 of the second actuator 26 can be used.

In FIG. 1, the second hydraulic gallery 24 fluidly connects the second lower fluidic chamber 20 of the first actuator 14 and the second lower fluidic chamber 31 of the second actuator 26. The second hydraulic gallery 24 can be considered to allow fluid to move or flow between the second lower fluidic chamber 20 of the first actuator 14 and the second lower fluidic chamber 31 of the second actuator 26.

In examples, any suitable means for providing fluidic connection between the second lower fluidic chamber 20 of the first actuator 14 and the second lower fluidic chamber 31 of the second actuator 26 can be used. For example, any suitable hose, tube and/or pipe and so on can be used.

Additionally or alternatively the second hydraulic gallery 22 can directly or indirectly connect the second lower chambers 20, 31 and/or can include any number of intervening elements, including no intervening elements. In examples, any suitable number of connections between the second lower fluidic chamber 20 of the first actuator 14 and the second lower fluidic chamber 31 of the second actuator 26 can be used.

In examples, the first and second hydraulic galleries can be considered first and second hydraulic connections, links, attachments, networks, couplings, joinings and so on.

In examples the first and second hydraulic galleries 22, 24 can be considered to include the fluidic chambers 18, 31, 20, 29 to which they are connected.

In the example of FIG. 1, the at least one pump 30 is configured to pump fluid, such as hydraulic fluid, between the first and second hydraulic galleries 22, 24. Any suitable hydraulic fluid can be used. In examples, any suitable pump or pumps can be used.

The actuator system 10 can comprise any suitable number of pumps 30 at any suitable location(s) to pump fluid between the first and second hydraulic galleries 22, 24.

For example, in examples the system 10 comprises a single bidirectional pump 30 configured to pump fluid between the first and second hydraulic galleries 22, 24. See, for example, FIGS. 11 and 12. Accordingly, in examples the actuator system 10 can comprise a single pump 30 per set of associated wheels 32, 34 or per axle 36.

In examples the pump or pumps 30 can be connected between the first and second hydraulic galleries 22, 24 in any suitable way to allow fluid to be pumped between the two hydraulic galleries 22, 24.

The pumping of fluid between the first and second hydraulic galleries 22, 24 allows for active movement control of a vehicle 46. In embodiments of the system 10 illustrated in FIGS. 10 to 12 in which the actuators 14, 26 couple the body 17 of a vehicle 46 to wheels 32, 34 on either side of the vehicle 46, for example associated with a common axle, the pumping of fluid between the first and second hydraulic galleries 22, 24 allows for active pitch and/or heave control of the vehicle 46.

For example, when the pump(s) 30 is controlled to pump fluid from the first hydraulic gallery 22 to the second hydraulic gallery 24 fluid will be moved from the first upper fluidic chambers 18, 29 of the first and second actuators 14, 26 to the second hydraulic gallery 24 and the second lower fluidic chambers 20, 31 of the first and second actuators 14, 26.

In examples, when the pump(s) 30 is controlled to pump fluid from the first hydraulic gallery 22 to the second hydraulic gallery 24 the pressure in the first hydraulic gallery, including the first upper fluidic chamber 18 of the first actuator 14 and the first upper fluidic chamber 29 of the second actuator 26, decreases and the pressure in the second hydraulic gallery 24, including the second lower fluidic chamber 20 of the first actuator 14 and the second lower fluidic chamber 31 of the second actuator 26 is increased.

Accordingly, when fluid is pumped from the first hydraulic gallery 22 to the second hydraulic gallery 24 the first and second actuators 14, 26 will tend to extend. This will cause the body 17 of the vehicle 46 to rise.

When the pump(s) 30 is controlled to pump fluid from the second hydraulic gallery 24 to the first hydraulic gallery 22 fluid will be moved from the second lower chambers 20, 31 of the first and second actuators 14, 26 to the first hydraulic gallery 22 and the first upper fluidic chambers 18, 29 of the first and second actuators 14, 26.

In examples, when the pump(s) 30 is controlled to pump fluid from the second hydraulic gallery 24 to the first hydraulic gallery 22 the pressure of the second hydraulic gallery 24, including the second lower fluidic chambers 20, 31 of the first and second actuators 14, 26 will decrease and the pressure of the first hydraulic gallery 22, including the first lower fluidic chambers 18, 29 of the first and second actuators 14, 26 will increase.

In such examples, the first and second actuators 14, 26 will tend to contract. Accordingly, in such examples the body 17 of the vehicle 46 will drop.

In this way, pitch and/or heave of the body 17 of the vehicle 46 can be actively controlled by use of the actuator system 10. In particular, pitch and/or heave of the body 17 of the vehicle 46 can be controlled by controlling the one or more pumps 30. In examples, this is achieved by using a simple hydraulic network compared to, for example, fully active suspension at each wheel of a vehicle.

Furthermore, the actuator system 10 of FIG. 10 provides for active, controllable pitch and/or heave control, not merely passive control which is also advantageous compared to, for example, passive suspension systems.

The actuator system 10 can be used to compensate and/or correct for body pitch and/or heave caused by movement of a vehicle 46.

In examples, if a vehicle 46 is accelerating vigorously this will cause the body 17 of the vehicle 46 to pitch backwards, tending to compress the actuators 14, 26 associated with rear wheels and extend actuators 14, 26 associated with front wheels.

In examples, within an actuator system 10 comprising actuators 14, 26 associated with the front wheels the pump(s) 30 can be controlled in such circumstances to pump fluid from the second hydraulic gallery 24 to the first hydraulic gallery 22 to counteract the extension of the actuators 14, 26 associated with front wheels. Additionally/alternatively, within an actuator system 10 comprising actuators 14, 26 associated with the rear wheels the pump(s) 30 can be controlled in such circumstances to pump fluid from the first hydraulic gallery 22 to the second hydraulic gallery 24 to counteract the compression of the actuators 14, 26 associated with rear wheels. In this way pitching of the body 17 of the vehicle 46 can be actively controlled.

In examples, if a vehicle 46 is decelerating vigorously this will cause the body 17 of the vehicle 46 to pitch forwards, tending to extend the actuators 14, 26 associated with rear wheels and compress actuators 14, 26 associated with front wheels.

In examples, within an actuator system 10 comprising actuators 14, 26 associated with the rear wheels the pump(s) 30 can be controlled in such circumstances to pump fluid from the second hydraulic gallery 24 to the first hydraulic gallery 22 to counteract the extension of the actuators 14, 26 associated with rear wheels. Additionally/alternatively, within an actuator system 10 comprising actuators 14, 26 associated with the front wheels the pump(s) 30 can be controlled in such circumstances to pump fluid from the first hydraulic gallery 22 to the second hydraulic gallery 24 to counteract the compression of the actuators 14, 26 associated with front wheels. In this way pitching of the body 17 of the vehicle 46 can be actively controlled.

As will be appreciated, in order to provide heave control, actuator systems 10 comprising actuators 14, 26 associated with rear and front wheels may be controlled such that the pump(s) 30 pump fluid between the first and second hydraulic galleries 22, 24 to counteract compression of the actuators 14, 26 associated with both the front and rear wheels, or to counteract extension of the actuators 14, 26 associated with both the front and rear wheels.

However, the actuator system 10 is configured to provide active pitch and/or heave control of the vehicle 46 as desired. For example, in certain circumstances it may be desired to encourage pitch and/or heave of the body 17 of the vehicle 46 and in such circumstances the at least one pump 30 can be controlled to pump fluid in the actuator system 10 to induce pitch and/or heave of the vehicle body 17.

Figure 11:
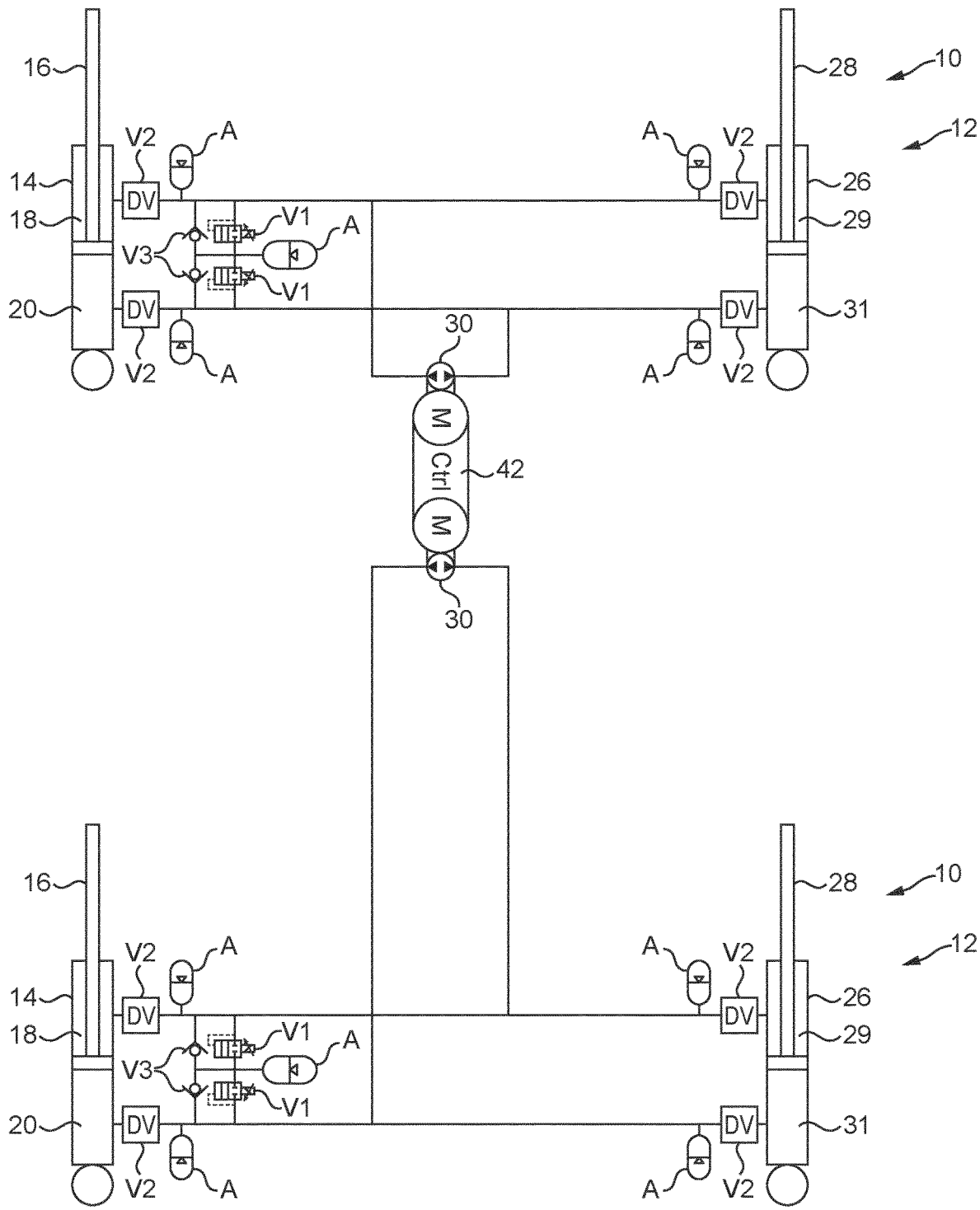
FIG. 11 illustrates an alternative example of plurality of actuator systems for a vehicle suspension system.

FIG. 11 illustrates an example of a plurality of actuator systems 10 for a vehicle suspension system 12. One or more elements in the example of FIG. 11 can be as described in relation to FIG. 10.

The example of FIG. 11 is similar to the example illustrated in FIG. 10. However, in the example of FIG. 11 there is a first actuator system 10 associated with a front axle and front wheels of a vehicle 46. This is the upper actuator system 10 illustrated in FIG. 11.

In addition, in the example of FIG. 11, a second actuator system 10, associated with a rear axle of a vehicle 46 is present. This is illustrated as the lower actuator system 10 in the example of FIG. 11.

However, in examples, any suitable number of actuator systems 10 on any suitable number of axles of a vehicle can be provided.

Accordingly, FIG. 11 illustrates a first actuator system 10 associated with a first axle of a vehicle 46 and a second, separate actuator system 10 associated with a second, different axle of a vehicle 46.

The actuator systems 10 in FIG. 11 comprise first and second actuators 14, 26 and first and second hydraulic galleries 22, 24 similarly to or the same as FIG. 10.

In the example of FIG. 11 the actuator systems 10 comprise a single bidirectional pump 30 configured to pump fluid between the first and second hydraulic galleries 22, 24 of the actuator systems 10.

The actuator systems 10 in FIG. 11 also comprise a number of pressure control valves V1, damper valves V2, check valves V3 and accumulators A to control movement of fluid around the actuator systems 10. The use of the valves and accumulators will not be described in detail herein.

Also illustrated in the example of FIG. 11 the actuator systems 10 comprises at least one controller 42 configured to control the at least one pump 30 to pump fluid between the first and second hydraulic galleries 22, 24 of the respective actuator systems 10. In the example of FIG. 11 a single controller 42 is shown. However, in examples, any suitable number of controllers 42 can be used. In addition, any suitable controller 42 or controllers 42 can be used, see, for example, FIG. 6.

In the example of FIG. 11 the controller 42 is configured to control the single, bidirectional pump 30 of the actuator systems 10 to control the pitch and/or heave of the body 17 of a vehicle 46 as described in relation to FIG. 10.

In the example of FIG. 11 the controller 42 is configured to control the extension or contraction of the first and second actuators 14, 26 of the actuator systems 10 in coordination or separately.

For example, the controller 42 is, in examples, configured to control the actuator systems 10 in a coordinated or independent fashion based on the requirements and/or environment and/or context of the vehicle 46.

Figure 12:
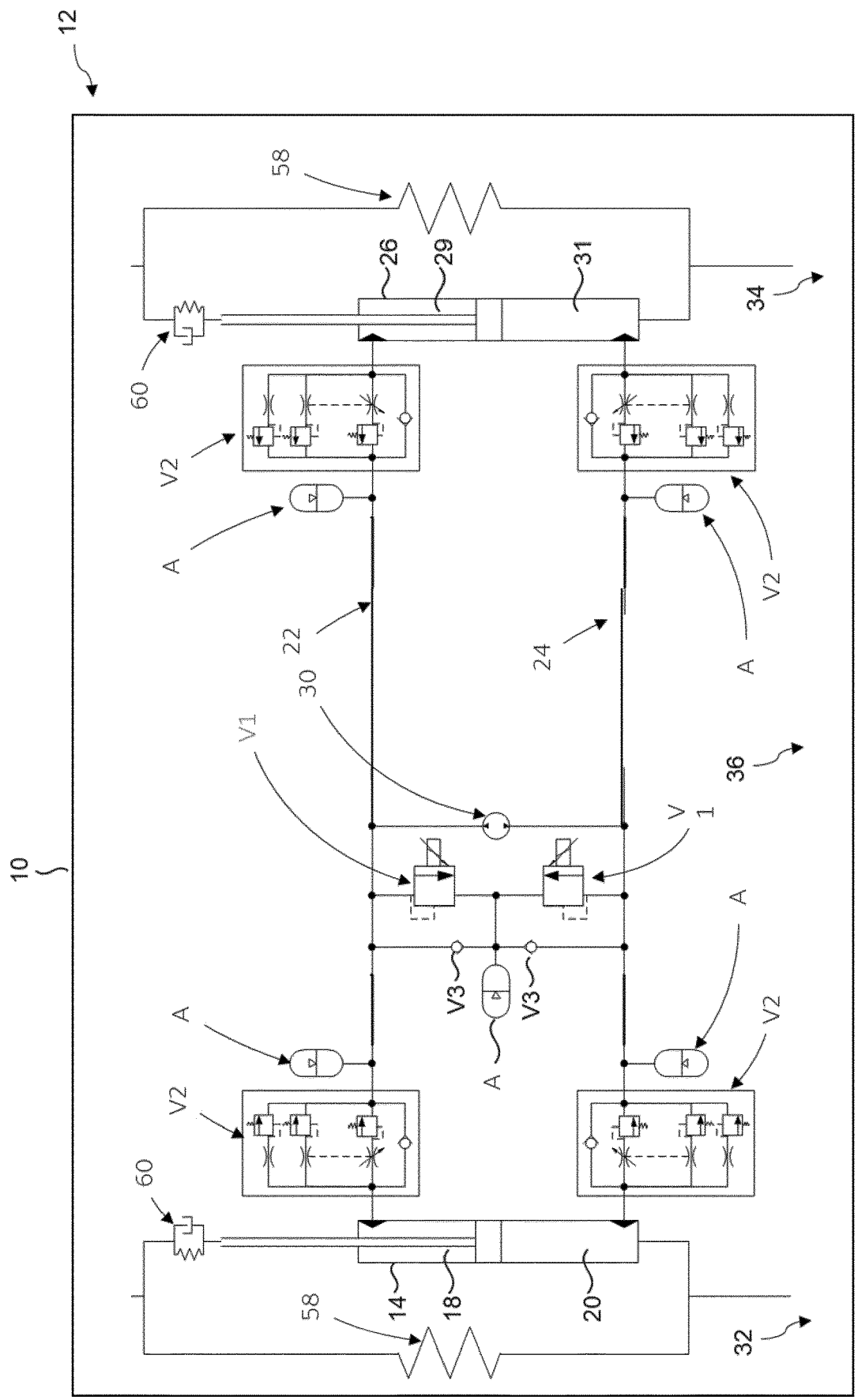
FIG. 12 illustrates an alternative example of an actuator system for a vehicle suspension system.

FIG. 12 illustrates an example of an actuator system 10 for a vehicle suspension system 12. One or more elements in FIG. 12 may be as described in relation to FIG. 10 and/or FIG. 11.

The actuator system 10 illustrated in FIG. 12 comprises first and second actuators 14, 26 and first and second hydraulic galleries 22, 24. The actuator system 10 of FIG. 12 also comprises various valves V1, V2, V3 and accumulators A.

In addition, in the example of FIG. 12 the vehicle suspension system 12 comprises springs or air springs 58 which couple the body 17 of the vehicle 46 to the associated wheels 32, 34. The suspension system 12 also comprises top mount 60.

In one embodiment of the example of FIG. 12, the first actuator 14 is coupled to a first wheel 32 and the second actuator 26 is coupled to a second wheel 34, wherein the first and second wheels 32, 34 share a common axle 36. In such an embodiment the actuator system 10 is able to control pitch and/or heave of the body 17 of the vehicle 46 as described in relation to FIG. 10 and/or FIG. 11.

In the example of FIG. 12 the actuator system 10 comprises a through connection, the through connection fluidly connecting the first fluidic chamber 18 of the first actuator 14 and the first fluidic chamber 29 of the second actuator 26 and fluidly connecting the second fluidic chamber 20 of the first actuator 14 and the second fluidic chamber 31 of the second actuator 26.

In examples, any suitable through connection can be used. For example, the through connection may be comprised in a valve block of the actuator system 10. In some examples the through connection may be internal to the valve block and comprises double outputs for each hydraulic gallery. In some examples the through connection may be a separate manifold block connected to the pump 30 by any suitable hydraulic connections such as pipes, hoses and so on.

As a system there may be a combined use of ports on the valve block, for example on a front axle, and a separate manifold, for example on the rear axle.

In the example of FIG. 12 the actuator system 10 comprises a single bidirectional pump 30 configured to pump fluid between the first and second hydraulic galleries 22, 24 to control pitch and/or heave of the body 17 of the vehicle 46 as described in relation to FIG. 10 and/or FIG. 11.

Figure 4:
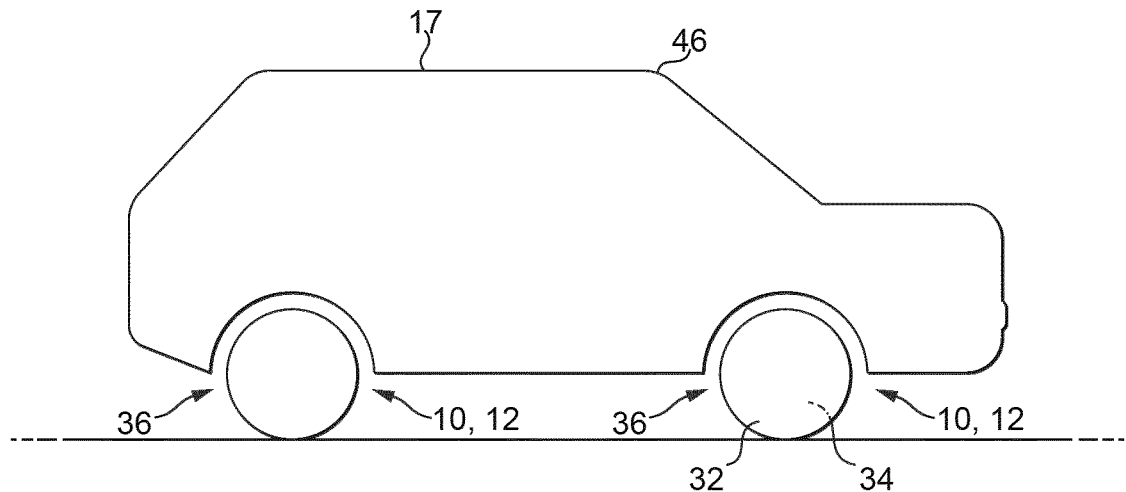
FIG. 4 illustrates an example of a vehicle.

FIG. 4 illustrates an example of a vehicle 46.

The vehicle 46 illustrated in the example of FIG. 4 illustrates an example of a road vehicle in which embodiments of the invention or inventions can be implemented. In some, but not necessarily all examples, the vehicle 10 is a passenger vehicle, also referred to as a passenger car or as an automobile. Passenger vehicles generally have kerb weights of less than 4000 kg. Passenger cars generally have lengths of less than 7 metres. In other examples, embodiments of the invention can be implemented for other applications, such as industrial vehicles.

In the illustrated example, the vehicle 46 comprises a body 17 and two actuator systems 10, 26 and associated vehicle suspension systems 12.

In the example of FIG. 4, the vehicle 46 comprises an actuator system 10 and vehicle suspension system 12 at the front and rear axle of the vehicle 46.

In examples, the actuator system 10 can be as described in relation to FIGS. 1 to 3 and/or FIGS. 10 to 12.

There is therefore provided a vehicle 46 comprising a first actuator system 10 associated with a first axle of the vehicle 46 and a second, separate actuator system 10 associated with a second, different axle of the vehicle 46.

In examples, the vehicle 46 is an autonomous vehicle.

Figure 5:
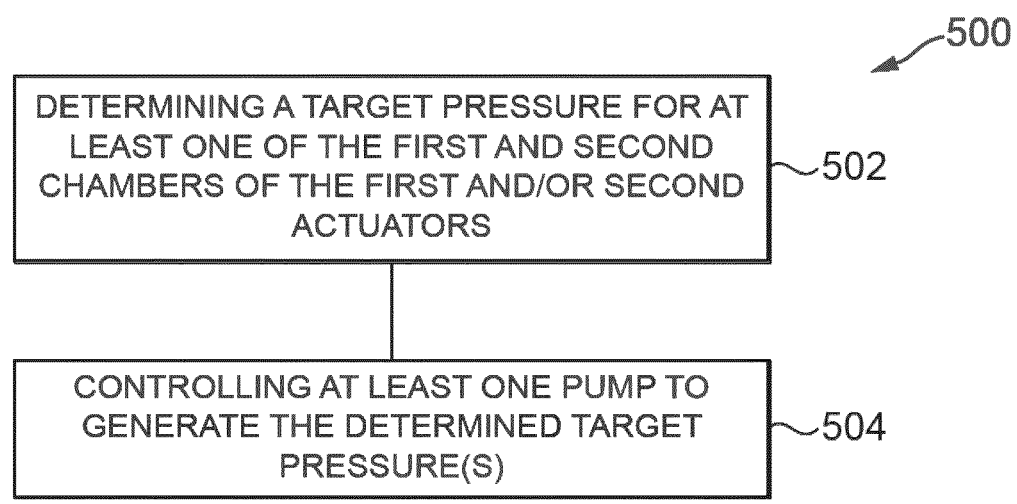
FIG. 5 illustrates an example of a method of operating an actuator system.

FIG. 5 illustrates an example of a method 500.

The method 500 is a method of operating the actuator system 10 as described in relation to FIGS. 1 to 3 and/or FIGS. 10 to 12 described herein.

However, in examples, any suitable method of operating the actuator system 10 described herein can be used.

At block 502 a target pressure for at least one of the first and second fluidic chambers 18, 20, 29, 31 of the first and/or second actuators 14, 26 is determined.

Any suitable method for determining a target pressure for at least one of the first and second fluidic chambers 18, 20, 29, 31 of the first and/or second actuators 14, 26 can be used.

In some examples, sensors (not shown) in association with one or more algorithms/computer programs/software or the like and a controller can determine an appropriate target pressure in one or more of the fluidic chambers 18, 20, 29, 31.

At block 504 the at least one pump 30 is controlled to generate the determined target pressure or pressures.

For example, the at least one pump 30 is, in examples, controlled to pump fluid in the actuator system 10 to achieve the determined target pressure(s) in the chamber(s) 18, 20, 29, 31.

In examples, controlling the at least one pump 30 comprises controlling the at least one pump 30 to pump fluid from the first hydraulic gallery 22 to the second hydraulic gallery 24.

In examples, controlling the at least one pump 30 comprises controlling the at least one pump 30 to pump fluid from the second hydraulic gallery 24 to the first hydraulic gallery 22.

In examples, it can be considered that at block 504 the pump is controlled to generate/control pressure in the first and second hydraulic galleries 22, 24.

In some, but not necessarily all, examples, the method 500 comprises controlling at least one valve to generate the determined target pressure or pressures. For example, the method 500 can comprise controlling at least one pressure control valve V1, at least one damper valve V2, and/or at least one check valves V3 to generate the determined target pressure or pressures.

FIG. 6 illustrates an example of a controller 42.

In examples the controller 42 can comprise a plurality of controllers 42 and may considered a control system.

The controller of FIG. 6 includes at least one electronic processor 54; and at least one electronic memory device 56 electrically coupled to the electronic processor 54 and having instructions (e.g. a computer program 52) stored therein, the at least one electronic memory device 56 and the instructions 52 configured to, with the at least one electronic processor 54, cause any one or more of the methods described herein to be performed.

An example controller 42 is an active actuator system controller, for controlling actuators of the active actuator system.

FIG. 6 also illustrates a non-transitory computer-readable storage medium 50 comprising the instructions (computer software) 52.

The controller/control system 42 may comprise a high-level controller. References to the control system controlling a pump or pumps mean either providing control signals directly to pump(s), or providing control signals indirectly via other controllers, such as low-level controllers which act in dependence on the control signal. References to the controller/control system 42 receiving information and references to making a determination mean either receiving raw unprocessed data, or receiving processed data from a controller external to the controller/control system 42.

Accordingly, computer software is provided that, when executed, is arranged to perform a method as described herein.

In examples, there is provided, a non-transitory computer readable medium 50 comprising computer readable instructions 52 that, when executed by a processor 54 causes performance of a method as described herein.

Accommodating systems in a vehicle 46, such as the actuator system 10 and vehicle suspension system 12 described in relation to FIGS. 1 to 6 and/or 10 to 12 can be difficult. For example, due to constraints on vehicle weight and/or size and/or layout it can be difficult to package appropriately various different components of the vehicle system, while maintaining functionality of the various vehicle systems.

For example, it can be difficult to appropriately locate conduits of a vehicle around other components of the vehicle, such as structural components.

Figure 7:
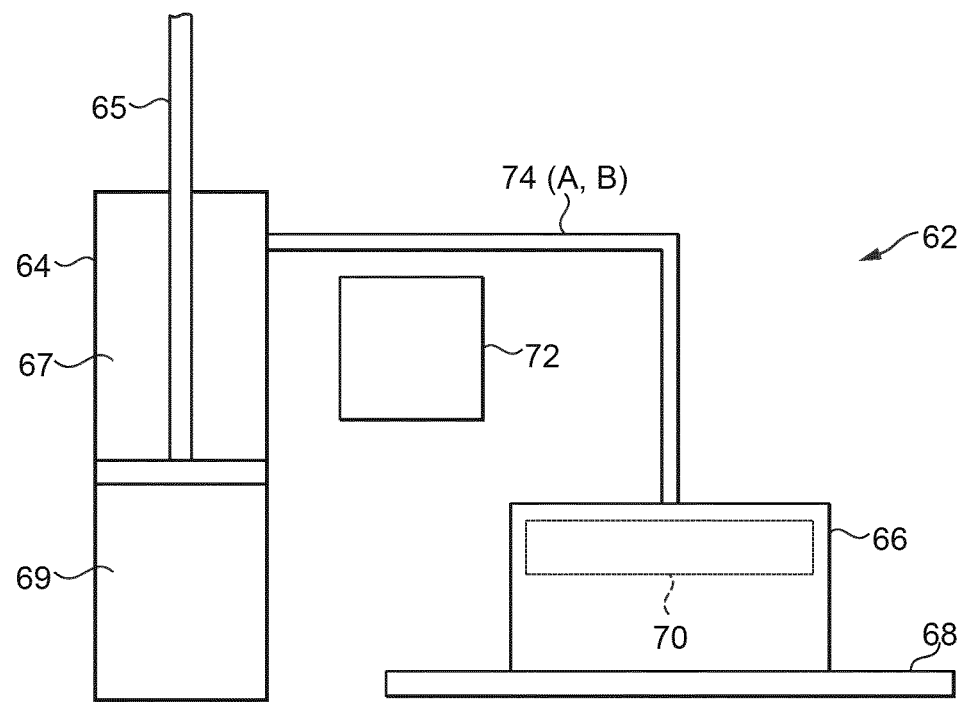
FIG. 7 illustrates an example of a system for a vehicle.

FIG. 7 illustrates an example of a system 62 for a vehicle 46.

In the example of FIG. 7 the system 62 comprises a hydraulic suspension actuator 64 comprising a piston 65, a first upper fluidic chamber 67 and a second lower fluidic chamber 69, the first and second fluidic chambers 67, 69 separated by the piston 65. In examples, the hydraulic suspension actuator 64 can be a first or second actuator 14, 26 as described in relation to FIGS. 1 to 6 and/or 10 to 12.

The system 62 also comprises at least one actuator system module 66 mounted to a subframe 68 and laterally separated from the hydraulic suspension actuator 64, the at least one actuator system module 66 comprising one or more actuator system components 70.

Accordingly, the actuator system module 66 defines a part of the sprung mass of the vehicle 46.

In addition, the system 62 comprises a longitudinal beam 72 located laterally between the hydraulic suspension actuator 64 and the at least one actuator system module 66 and at least one conduit 74 fluidly connecting the hydraulic suspension actuator 64 and the at least one actuator system module 66, wherein the at least one conduit 74 passes over the longitudinal beam 72.

In examples, the hydraulic suspension actuator 64 can be an actuator as described in relation to FIGS. 1 to 6 and/or 10 to 12. That is, in examples, the hydraulic suspension actuator 64 can be configured for use in an actuator system 10 as described in relation to FIGS. 1 to 6 and/or 10 to 12.

However, in examples, any suitable hydraulic suspension actuator 64 for use in any suitable vehicle suspension system can be used.

The at least one actuator system module 66 is mounted on a subframe 68 of the vehicle 46. In examples, any suitable actuator system module 66 can be used. Additionally or alternatively, any suitable number of actuator system modules 66 can be used.

In examples, the actuator system module 66 comprises one or more actuator system components 70. Any suitable actuator system component 70 can be comprised in the actuator system module 66.

For example, the actuator system module 66 can comprise any suitable component or components for use in controlling and/or directing flow of hydraulic fluid in an actuator system.

In examples, the actuator system components 70 can comprise one or more components described in relation to FIGS. 1 to 6 and/or 10 to 12 such as one or more valves V, one or more accumulators A, one or more pumps 30 and so on.

In general, the actuator system components 70 can be any suitable component 70 for use in an actuator system such as the actuator system 10 described in relation to FIGS. 1 to 6 and/or 10 to 12.

The longitudinal beam 72 is located laterally between the hydraulic suspension actuator 64 and the at least one actuator system module 66. In examples, the longitudinal beam 72 can be considered to be between the hydraulic suspension actuator 64 and the actuator system module 66.

The longitudinal beam 72 may be considered a frame rail and/or chassis beam and may be substantially straight, to provide a substantially straight load path through a chassis structure of the vehicle 46.

The longitudinal beam 72 may extend in a direction which is substantially parallel with a principle or longitudinal axis of the chassis of the vehicle 46.

Accordingly, in examples, the longitudinal beam extends in a longitudinal direction and is located laterally between the hydraulic suspension actuator 64 and the at least one actuator system module 66.

In the example of FIG. 7 the longitudinal direction is into/out of the page and the lateral direction is across the page.

The longitudinal beam 72 can be considered to be a part of the chassis structure of the vehicle 46.

In examples, the location of the longitudinal beam 72 can be different than that illustrated in the example of FIG. 7. For example, the longitudinal beam 72 can be located higher or lower or to left or right of the position indicated in the example of FIG. 7.

In FIG. 7 the at least one conduit 74 fluidly connects the hydraulic suspension actuator 64 and the at least one actuator system module 66 and passes over the longitudinal beam 72.

In examples the at least one conduit 74 can be considered to be routed over or above, to cross over or above, to run over or above and/or to be located over or above the longitudinal beam 72.

The at least one conduit 74 can be considered, in examples, to be at least one hose, at least one tube, at least one pipe and so on.

In examples the at least one conduit 74 can be considered to be at least one connection, links, at least one attachment, at least one network, at least one coupling, at least one joining and so on.

In examples, the at least one conduit 74 is configured to allow fluid to flow between the hydraulic suspension actuator 64 and actuator system module 66 during, for example, operation of an actuator system 10.

The locating or routing of the at least one conduit 74 over the longitudinal beam 72 is advantageous as it provides for convenient packaging of the system 62 without risking damage to the structure of the at least one conduit 74 which may be caused if the at least one conduit 74 was routed otherwise.

For example, if the at least one conduit 74 were routed under the longitudinal beam 72 this could cause the at least one conduit 72 to come into contact with a road surface under compression of the hydraulic suspension actuator 64 risking damage to the at least one conduit 74.

In examples, the system 62 comprises a first conduit 74A fluidically connecting the first upper fluidic chamber 67 to the at least one actuator system module 66 and a second separate conduit 74B fluidically connecting the second lower fluidic chamber 69 to the at least one actuator system module 66.

Figure 8:
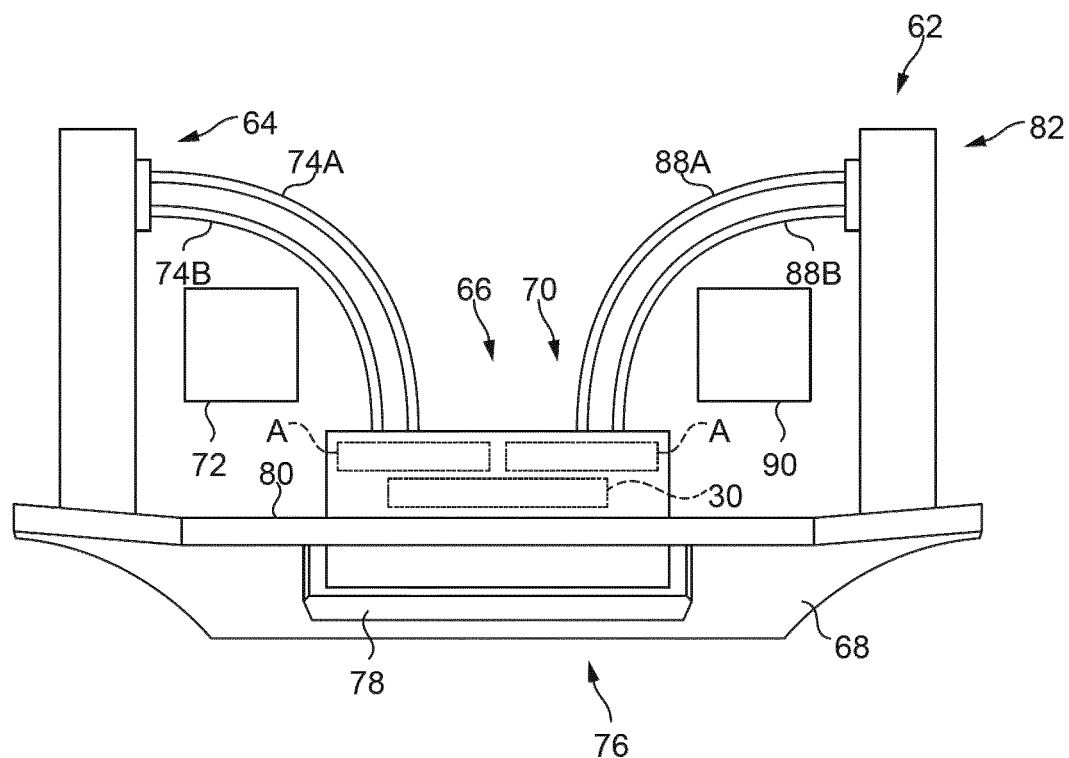
FIG. 8 illustrates an example of a system for a vehicle.

See, for example, FIG. 8.

FIG. 8 illustrates an example of a system 62 for a vehicle 46. One or more components of the example illustrated in FIG. 8 can be as described in relation to FIG. 7.

In the example of FIG. 8 the system 62 comprises a hydraulic suspension actuator 64, an actuator system module 66 and a longitudinal beam 72 as described in relation to FIG. 7.

In the example of FIG. 8 the system 62 comprises two conduits 74A and 74B fluidically connecting upper and lower chambers 67, 69 (not shown in FIG. 8) of the hydraulic suspension actuator 64 to the actuator system module 66. It can be seen in the example of FIG. 8 that the plurality of conduits 74A, 74B pass/are routed over the longitudinal beam 72.

In the example of FIG. 8 the actuator system module 66 comprises actuator system components 70 including accumulators A and a pump 30.

Accordingly, the at least one actuator system module 66 comprises at least one pump 30 and at least one accumulator A.

In the example of FIG. 8 the system 62 comprises a second hydraulic suspension actuator 82 comprising a piston, a first upper fluidic chamber and a second lower fluidic chamber, the first and second fluidic chambers separated by the piston (not illustrated in the example of FIG. 8).

The system 62 of FIG. 8 also comprises a second longitudinal beam 90 located laterally between the second hydraulic suspension actuator 82 and the at least one actuator system module 66 and at least one conduit 88 fluidly connecting the second hydraulic suspension actuator 64 and the at least one actuator system module 66, wherein the at least one conduit 88 passes over the second longitudinal beam 90.

In examples, the second longitudinal beam 90 can be the same/similar to the longitudinal beam 72 described in relation to FIG. 7.

In examples, the longitudinal beam 72 and second longitudinal beam 90 are substantially parallel and form structural elements of the chassis of the vehicle 46.

In examples, the hydraulic suspension actuator 64 and second hydraulic suspension actuator 82 can be considered corresponding hydraulic suspension actuators. That is, in examples, the first and second hydraulic suspension actuators 64 are associated with a common axle 92. See, for example, FIG. 9.

In the example of FIG. 8 the at least one second conduit 88 comprises first and second conduits 88A and 88B. The routing of the conduits 88A and 88B across/over the second longitudinal beam 90 is advantageous in relation to the packaging of the system 62 and maintenance/protection of the conduits 88A and 88B.

It can be seen in the example of FIG. 8 that the actuator system module 66 is located substantially centrally between the longitudinal beams 72, 90 and hydraulic suspension actuators 64, 82.

In the example of FIG. 8, the subframe 68 to which the actuator system module 66 is mounted comprises an aperture 76. In examples, the aperture 76 can be considered a hole, a void an opening, an orifice, a window, a space and so on.

In the example, the at least one actuator system module 66 is mounted to the subframe 68 in the aperture 76 via at least one mounting plate 78 that protrudes below the upper surface 80 of the subframe 68.

That is, in examples, the actuator system module 66 can be considered to be sunk relative to the upper surface 80 of the subframe 68.

Additionally, or alternatively, the mounting plate 78 can be considered to be recessed into the aperture 76 of the subframe 68.

In examples, the at least one actuator system module 66 can be fixed to the mounting plate using any suitable means. For example, using one or more bolts.

Additionally, or alternatively, the mounting plate 78 can be fixed to the subframe 68 using any suitable means. In examples, the at least one mounting plate 78 is fixed to the subframe 68 using at least one bolt.

In examples, the mounting plate(s) 78 can be fixed to the upper surface 68 and/or lower surface 68 of the subframe 68.

The mounting of the at least one actuator system module 66 in an aperture 76 of a subframe 68 is advantageous as it provides for a saving in height of the actuator system module 66.

This is advantageous in, for example, the arrangement of the components of the system 62 and other components of the vehicle 46.

In examples, the system 62 illustrated in FIG. 8 may comprise various other elements or components of a suspension system.

Figure 9:
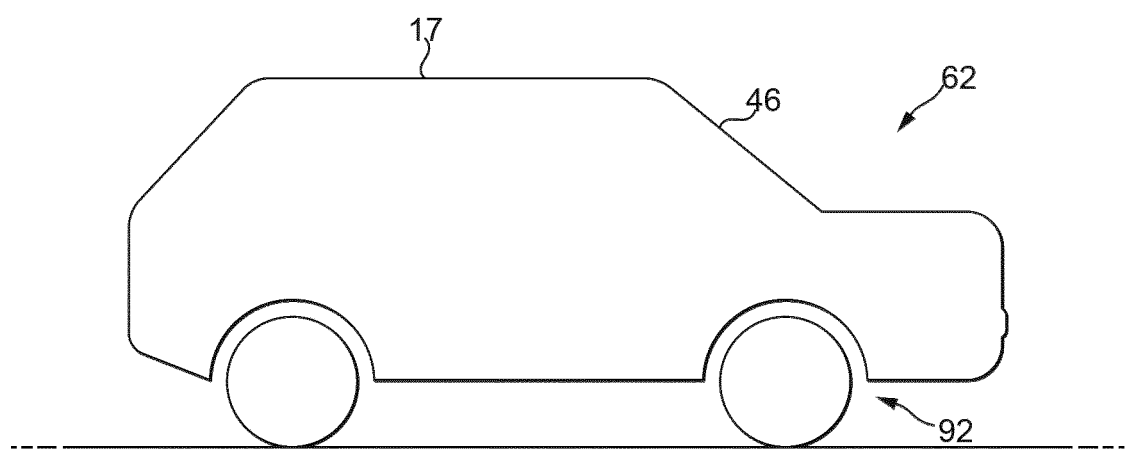
FIG. 9 illustrates an example of a vehicle.

FIG. 9 illustrates an example of a vehicle 46.

The vehicle 46 illustrated in the example of FIG. 9 illustrates an example of a road vehicle in which embodiments of the invention or inventions can be implemented. In some, but not necessarily all examples, the vehicle 46 is a passenger vehicle, also referred to as a passenger car or as an automobile. Passenger vehicles generally have kerb weights of less than 4000 kg. Passenger cars generally have lengths of less than 7 metres. In other examples, embodiments of the invention can be implemented for other applications, such as industrial vehicles.

In the example of FIG. 9 the vehicle 46 comprises a body 17 and a system 62 as described in relation to FIG. 7 and/or FIG. 8.

Accordingly, FIG. 9 illustrates a vehicle 46 comprising at least one system 62 as described in relation to FIG. 7 and/or FIG. 8.

In the example of FIG. 9 the first and second hydraulic suspension actuators 64, 82 are associated with a common axle 92 of the vehicle 46. However, in alternative examples and/or embodiments, the first and second hydraulic suspension actuators may be associated with different front and rear axles 92 of the vehicle 46.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 5 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An actuator system for a vehicle suspension system comprising:
    a first actuator comprising a piston, a first upper fluidic chamber and a second lower fluidic chamber, the first and second fluidic chambers separated by the piston;
    a second actuator comprising a piston, a first upper fluidic chamber and a second lower fluidic chamber, the first and second fluidic chambers separated by the piston;
    a first hydraulic gallery fluidly connecting the first upper fluidic chamber of the first actuator and one of the first and second fluidic chambers of the second actuator;
    a second hydraulic gallery fluidly connecting the second lower fluidic chamber of the first actuator and the other of the first and second fluidic chambers of the second actuator; and
    at least one pump configured to pump fluid between the first and second hydraulic galleries,
    wherein the first actuator is coupled to a first wheel and the second actuator is coupled to a second wheel, and wherein the first and second wheels share a common axle.

2. The actuator system of claim 1, wherein the system comprises a single, bidirectional pump configured to pump fluid between the first and second hydraulic galleries.

3. The actuator system of claim 1, wherein the first hydraulic gallery fluidly connects the first upper fluidic chamber of the first actuator and the second lower fluidic chamber of the second actuator, and the second hydraulic gallery fluidly connects the second lower fluidic chamber of the first actuator and the first upper fluidic chamber of the second actuator.

4. The actuator system of claim 3, comprising a cross over connection, the cross over connection fluidly connecting the first fluidic chamber of the first actuator and the second fluidic chamber of the second actuator; and
    fluidly connecting the second fluidic chamber of the first actuator and the first fluidic chamber of the second actuator.

5. The actuator system of claim 1, wherein the first hydraulic gallery fluidly connects the first upper fluidic chamber of the first actuator and the first upper fluidic chamber of the second actuator, and the second hydraulic gallery fluidly connects the second lower fluidic chamber of the first actuator and the second lower fluidic chamber of the second actuator.

6. The actuator system of claim 5, comprising a through connection, the through connection fluidly connecting the first fluidic chamber of the first actuator and the first fluidic chamber of the second actuator; and fluidly connecting the second fluidic chamber of the first actuator and the second fluidic chamber of the second actuator.

7. The actuator system of claim 1, comprising at least one controller configured to control the at least one pump to pump fluid between the first and second hydraulic galleries.

8. A vehicle comprising at least one actuator system as claimed in claim 1.

9. The vehicle of claim 8, comprising a first actuator system associated with a first axle of the vehicle and a second, separate actuator system associated with a second, different axle of the vehicle.

10. A method of operating the actuator system as claimed in claim 1, the method comprising:
    determining a target pressure for at least one of the first and second chambers of the first and/or second actuators; and
    controlling the at least one pump to generate the determined target pressure or pressures.

11. A non-transitory computer readable medium comprising computer readable instructions that, when executed by a processor, cause performance of a method of claim 10.

* * * * *